United States Patent [19]

Petrak

[11] 4,331,210
[45] May 25, 1982

[54] LIVE SPINDLE VEHICLE DRIVE WHEEL ASSEMBLY WITH AXIALLY MOVEABLE AXLE

[75] Inventor: Harry A. Petrak, Boulder, Colo.

[73] Assignee: Tenneco, Inc., Deerfield, Ill.

[21] Appl. No.: 143,198

[22] Filed: Apr. 24, 1980

[51] Int. Cl.³ .................... B60K 17/00; F16C 13/00
[52] U.S. Cl. .................................. 180/70 R; 180/75;
180/254; 301/126; 301/131; 308/16
[58] Field of Search ............... 180/70 R, 75, 88, 253,
180/254, 255; 301/1, 6 R, 6 E, 124 R, 124 H,
126, 131, 132; 308/16, 202

[56] References Cited

U.S. PATENT DOCUMENTS

| | | | |
|---|---|---|---|
| 2,052,524 | 8/1936 | Baker | 301/1 |
| 2,145,089 | 1/1939 | Kysor | 301/6 R |
| 2,693,393 | 11/1954 | Heth | 180/88 |
| 3,635,303 | 1/1972 | Hetmann et al. | 180/75 |
| 4,010,986 | 3/1977 | Otto | 301/6 E |

Primary Examiner—Joseph F. Peters, Jr.
Assistant Examiner—Donn McGiehan
Attorney, Agent, or Firm—Thomas E. Torphy; James R. Hagen

[57] ABSTRACT

An assembly maintenance tube maintains a live spindle mounted within a bore of a vehicle mounting component. The maintenance tube has a central aperture for receiving in a spaced relationship a drivable axle. The axle is drivingly connected to the live spindle in a manner which allows axial movement of the axle relative to the spindle to relieve stress in the drive train which drives the axle.

14 Claims, 2 Drawing Figures

LIVE SPINDLE VEHICLE DRIVE WHEEL ASSEMBLY WITH AXIALLY MOVEABLE AXLE

BACKGROUND OF THE INVENTION

Vehicle wheel assemblies of the live spindle type are currently known to those skilled in the art of vehicle wheel assembly design. U.S. Pat. No. 4,010,986 shows a typical live spindle design in which the spindle is journaled or mounted for rotation in a bore of a mounting component attached to the vehicle. Bearings are interposed between the mounting component and the spindle. A drive axle is inserted through a central bore or aperture in the spindle. Generally, the drive axle is threaded on one end and has a bearing retaining flange adjacent the opposite end. A nut on the threaded end is torqued down sufficiently to maintain the assembled components in the desired relationship and the axle is substantially rigidly affixed to the spindle so that the spindle and axle must rotate together at all times and no axial movement of the axle relative to the spindle is allowed. The prior art axles of the live spindle type do not permit axial movement of the axle relative to the spindle to relieve stresses imposed on the drive train components which drive the axle.

The prior art live spindle designs generally provide acceptable constructions in those applications where the axis of the drive shaft does not deflect from a fixed plane. A typical example of such constructions is the conventional rear drive axle in which a rigid tubular housing envelopes the drive axle shaft and maintains a single plane and a single swing axis from one rear wheel to the other as well as a fixed length of the drive axle to a different gear or other power source.

In motor vehicles having independent suspension each independently suspended wheel can move separate from the other wheels. Consequently, in independently suspended drive wheels the drive shaft centerline is required to pass through more than one plane. This movement requires universal joints and sliding joints, generally of the telescoping type, which enable the drive train to deflect transversely and lengthen and shorten axially.

Additionally, independently suspended wheels which also are articulated to serve as steerable wheels must move through a suspension arc and also are subject to movement about an inclined axis dictated by the steering geometry. These compounded movements cause the drive train universal joints to constantly seek to center about a multiplicity of intersecting planes when the wheel undergoes suspension deflection and simultaneous steer turning.

The presence of normal manufacturing tolerances creates additional need for the drive train to seek transverse and axial adjustments.

The inability of the drive train and universal joints to readily properly adjust or position itself in response to a suspension deflection and/or steer movement creates imbalanced or eccentric rotation of the drive train. The consequences of imbalanced drive train rotation and/or misalignment generally are vibrations. These vibrations may range from being small in amplitude and of short duration, but irritating, to so severe that components such as universal joints are ruined.

Furthermore, in conventional live spindle constructions the ability of the wheel to support the vehicle and be steerable is dependent upon the structural integrity of the stub axle, which maintains the spindle in the hub. If the stub axle breaks the wheel may be detached from the vehicle and consequently no longer support it. If the wheel is also articulated breakage of the stub axle would cause the vehicle to be substantially unsteerable.

BRIEF SUMMARY OF THE INVENTION

A vehicle wheel assembly of the live spindle type is maintained assembled by an assembly maintenance tube having a central aperture or bore which receives the drive axle in a spaced relationship. As the axle does not serve to maintain the spindle assembled in the bore of a mounting component it is drivingly connected to the spindle by a ring gear and spline which permits the axle axial movement relative to the spindle. Such axial movement aids in relieving stresses imposed on the drive train which drives the axle.

DESCRIPTION OF THE PREFERRED EMBODIMENT

Figure 1:
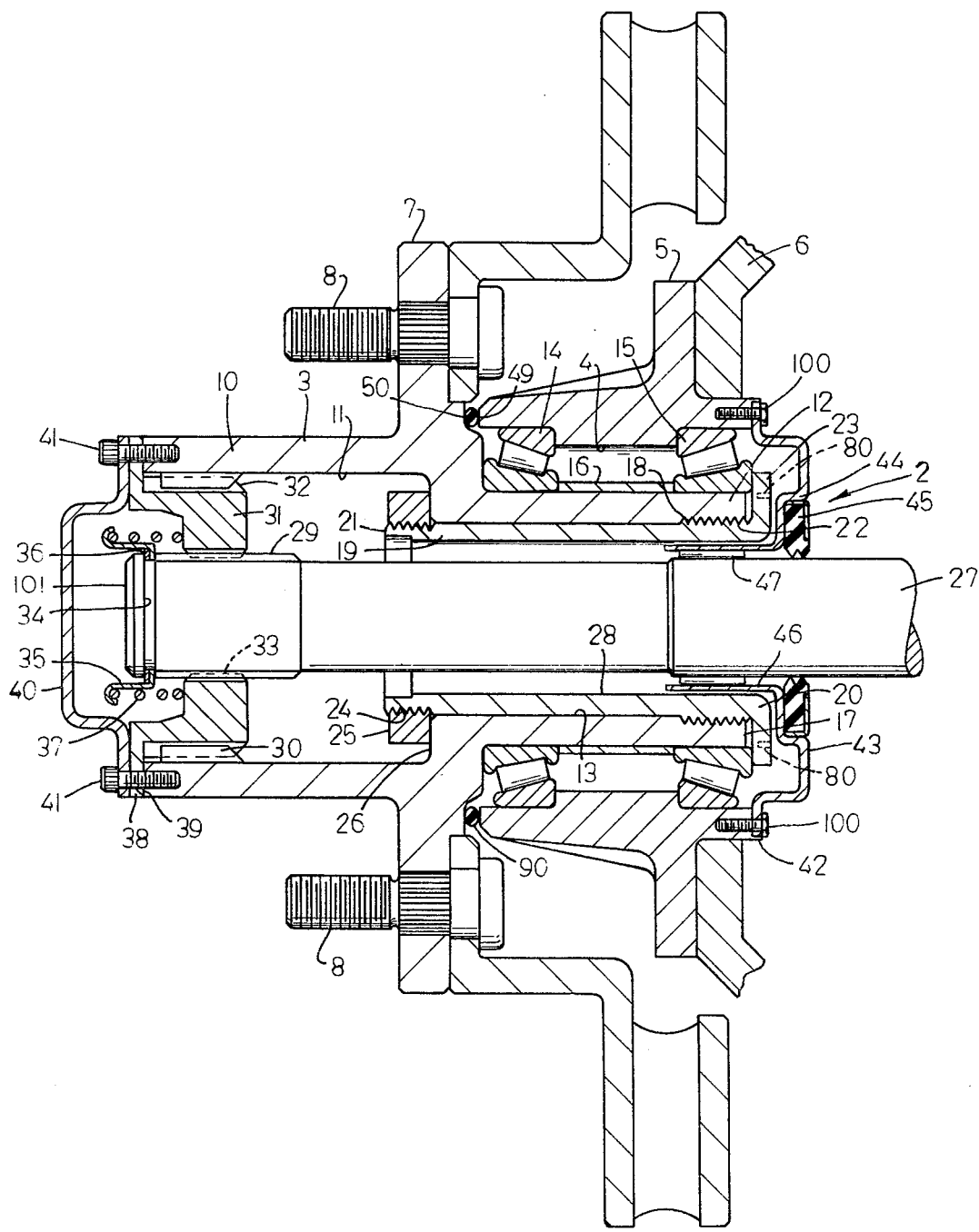
FIG. 1 is a full sectional view of a vehicle wheel assembly of this invention.

As shown in FIG. 1 the live spindle wheel assembly 2 of this invention is comprised of a spindle 3 journaled for rotation in a bore 4 of a mounting member, such as non-rotating hub 5, having an attachment means, such as steering knuckle 6, for attaching the assembly to appropriate vehicle components (not shown) such as conventional, well known ball joints.

To facilitate description of this invention the term "outboard" shall mean a direction parallel to the longitudinal axis of assembly 2 and away from the vehicle on which the assembly is, or may be, mounted, and "inboard" shall mean a direction parallel to the longitudinal axis of the assembly and toward the vehicle on which the assembly is, or may be, mounted.

Spindle 3 is provided with a wheel attachment means such as flange 7 having wheel fastening means, such as a plurality of lug bolts 8.

Spindle 3 further has a first cylindrical outboard portion 10 having a bore 11 and a secondary cylindrical inboard portion 12 having a bore 13.

Interposed between bore 4 of non-rotating hub 5 and cylindrical portion 12 of spindle 3 are friction reducing means such as tapered roller bearing assemblies 14 and 15 having a spacer 16 interposed between them to aid in maintaining the bearing assemblies at a desired axial distance from each other.

Adjacent an axially inboard end 17 of spindle 3 bore 13 has a threaded portion 18.

An assembly maintenance tube 19 having an inboard end 20 and an outboard end 21 is placed within bore 13 of cylindrical portion 12 of spindle 3. Adjacent inboard end 20 of tube 19 is a threaded portion 22 threadedly engaged with the threaded portion 18 of spindle 3.

Integral with or affixed to end 20 of tube 19 is a radially outwardly extending flange 23. Flange 23 extends radially outward for contacting a portion of bearing 15. Torque imposing means, such as holes 80 to receive a spanner wrench, are provided on flange 23 to enable the maintenance tube 19 to be torqued into the desired engagement with the spindle to place an appropriate pressure on the bearings to provide free rotation while preventing axial movement of the spindle relative to the mounting member.

Assembly maintenance tube 19 also has a threaded portion 24 adjacent outboard end 21. A nut 25 is threadedly engaged with threaded portion 24 of tube 19. When the nut 25 is torqued down tightly against an appropriate surface, such as a shoulder 26 which serves as a transition between bore 11 and bore 13, it serves as a jam nut to prevent unintentional loosening of assembly tube 19 from spindle 3. Thus, assembly maintenance tube 19 maintains spindle 3, bearings 14 and 15 and mounting component 5 assembled as a wheel assembly which allows spindle 3 to rotate within bore 4 of mounting component 5.

A driveable axle 27 is inserted through a central bore 28 in the assembly maintenance tube 19. Axle 27 has a first or inboard end which is connected to drive train components (not shown) which impose torque on the axle and causes it to be driven. Axle 27 has a second or outboard terminal end 101. Adjacent end 101 on axle 27 a drive means, such as spline 29, is provided.

Within bore 11 a drive means, such as a radially inwardly facing spline 30, is affixed to spindle 3 and spaced concentric with and radially outwardly from spline 29. An appropriate connector, such as ring gear 31, which has radially inwardly facing teeth 32 engaged with spline 29 on axle 27 drivingly connects axle 27 to spindle 3 whereby when the axle is forced to rotate the spindle rotates also. However, due to the splined engagement of the axle 27 with ring gear 31 the axle 27 is allowed to move axially with respect to spindle 3.

Preferably, an annular groove 34 is provided in axle 27 adjacent end 101 and a spring retainer cup 35 is placed over the axle and restrained from axial outward or outboard movement by appropriate means, such as snap ring 36. A biasing means, such as helical spring 37, is interposed between the ring gear 31 and the retaining cup 35 to resiliently urge axle 27 axially outwardly.

Ring gear 31 has appropriate means, such as radially extending flange 38 which engages an outboard end 39 of spindle 3, for preventing axial movement of the ring gear relative to the spindle.

Closure means, such as a conventional hub cap 40, is fixedly secured to the outboard end 39 of spindle 3 to prevent entry of contaminants into the wheel assembly or exit of lubricant from the assembly. The hub cap and ring gear are secured to end 39 of spindle 3 by appropriate means, such as a plurality of threaded fasteners 41.

At the inboard end 42 of hub 5 is affixed a seal and stabilizing component 43. Component 43 extends radially inwardly toward axle 27, has a seal retainer, such as annular offset 44, for retaining a lubricant seal 45 in resilient sealing engagement with axle 27 and an axially outboard extending cylindrical stabilizer portion 46 which is interposed between bore 28 of assembly maintenance tube 19 and axle 27. Stabilizer portion 46 is radially spaced from each axle 27 and bore 28 of assembly maintenance tube 19.

An appropriate bearing means, such as needle bearing assembly 47, is placed between axle 27 and stabilizer portion 46. The needle bearing is preferably axially affixed, such as by a press fit to either the axle or the stabilizer portion and axially slidable with respect to the other member. Bearing 47 facilitates rotary motion of axle 27 and its slidable relation with either the stabilizer component or the axle enables axial movement of the axle relative to spindle 3.

The stabilizer portion and needle bearing serve as an inboard radial support of axle 27 preventing transverse cocking stresses of the spline 29 within spline 33.

A plurality of positive attachment means, such as threaded fastener 100, are preferably used to maintain component 43 affixed to hub 5, as shown.

A resilient seal member, such as annular resilient seal 90, is preferably placed between an axial outboard facing surface 49 of component 5 and an axial inboard facing surface 50 of spindle 3 to render the bearing box of the wheel assembly 2 a substantially sealed unit.

The wheel assembly of this invention is most beneficially applied to vehicle drive wheels which are independently resiliently suspended on a vehicle. In such arrangements the wheel assembly is generally forced to move separate from the rotary power source, such as a transfer case or differential to which the drive train connected to axle 27 is connected. Such movements cause changes in the length of the drive train which drives the axle and cause angularly adjustable components, generally well known universal joints, to adjust to different plane and angular positions.

Axial movement of the axle 27 in assembly 2 aids in relieving stresses imposed on the drive train by such movements.

Figure 2:
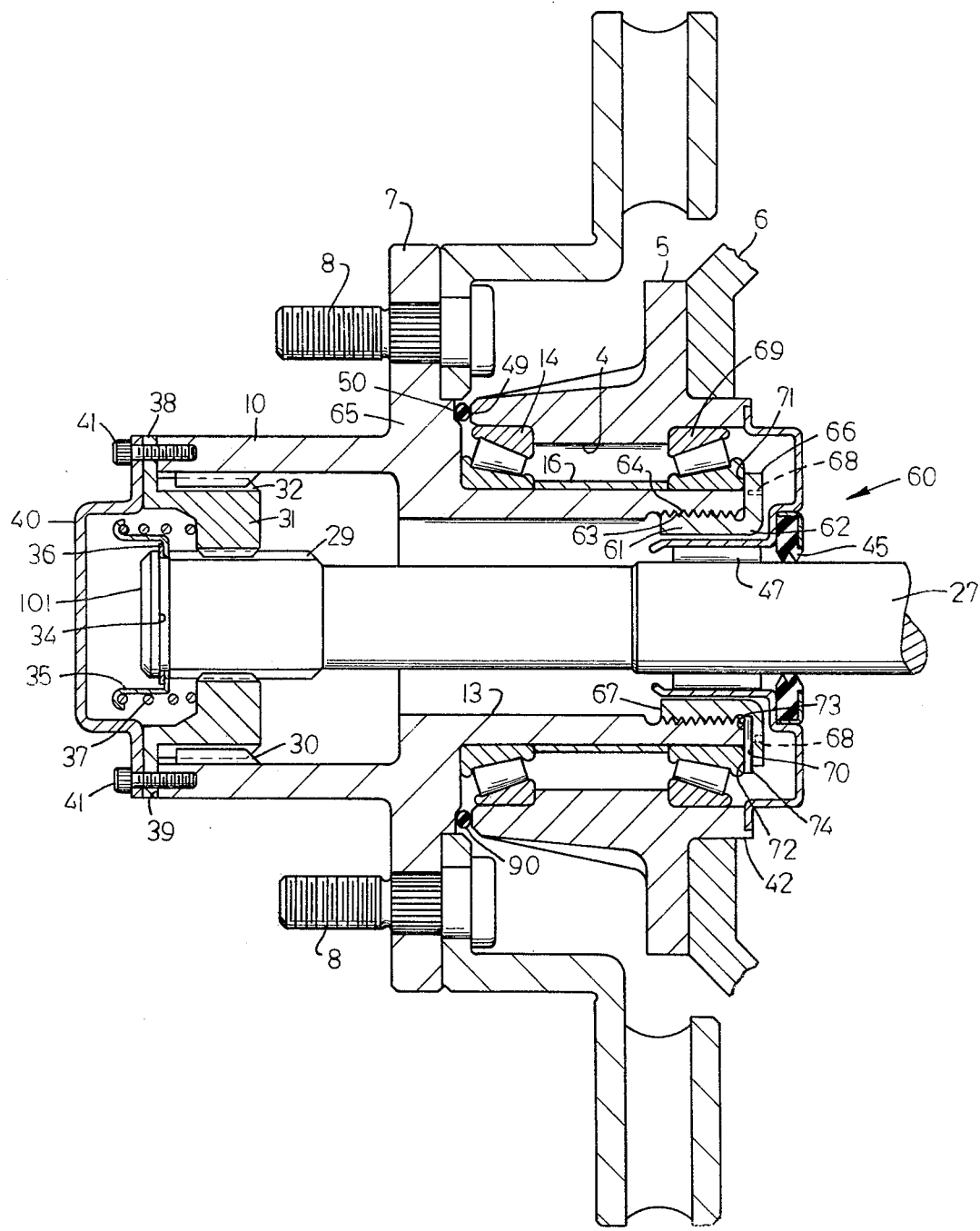
FIG. 2 is a full sectional view of an alternative embodiment of a vehicle wheel assembly of this invention.

FIG. 2 shows a wheel assembly 60 identical to that shown in FIG. 1 except for an alternate assembly maintenance tube 61.

The assembly maintenance tube 61 has a first or inboard end 62, a threaded portion 63 which threadedly engages a threaded portion 64 of a spindle 65, and a flange 66 which is integral with or affixed to tube 61 and extends radially outwardly from end 62.

Maintenance tube 61 has an axial outboard terminal end 67.

Torque imposing means, such as holes 68 for a spanner wrench or, alternatively, wrench receiving flats (not shown), such as in a hexagonal pattern, are provided on flange 66 so the maintenance tube can be torqued into the proper engagement with a bearing 69.

To prevent unintentional loosening of assembly maintenance tube 61 from spindle 65 a radially extending slot 70 is provided in flange 66. Slot 70 is formed in the axial outboard side 71 of flange 66 and upon imposing the desired torque on the assembly maintenance tube a spring pin or roll pin 74 is forced into the slot 70. Pin 74 is appropriately sized relative to slot 70 so that it engages a portion 72 of bearing 69 and a portion of the end 73 of spindle 65 in an interference fit.

I claim:

1. In a vehicle wheel assembly having a live spindle mounted for rotation in a mounting member, said live spindle having a central aperture, the improvement comprising, in combination:

assembly maintenance means within said central aperture of said live spindle for maintaining said live spindle mounted in said mounting member, said assembly maintenance means having a central aperture;

a driveable axle within said central aperture of said assembly maintenance means, the peripheral surface of said axle being in an inwardly spaced relationship from a surface defining said central aperture; and drive means connecting said live spindle to said driveable axle for causing said spindle to rotate when said driveable axle rotates and for enabling said driveable axle axial movement with respect to said live spindle whereby when a drive train connected to said driveable axle changes in length due to a change in position of said wheel assembly with respect to said drive train said axial movement of said driveable axle with respect to said live spindle enables relief of stress imposed on said drive train.

2. The invention as defined in claim 1 in which said drive means is a spline on said axle engaged with a ring gear affixed to said spindle.

3. The invention as defined in claim 1 in which said assembly maintenance means is comprised of an assembly maintenance tube and said tube is received within said central aperture of said live spindle and said tube has a central aperture for receiving said axle in a radially spaced relationship.

4. The invention as defined in claim 3 in which said assembly maintenance tube is threadedly engaged with said central aperture in said spindle and said assembly maintenance tube has a radially extending flange extending radially outwardly from said tube and anti-friction means are interposed between said mounting member and said spindle and said flange contacts at least a portion of said anti-friction means for maintaining said spindle assembled with said bore of said mounting member.

5. In a vehicle wheel assembly having a live spindle mounted for rotation in a mounting component fixedly engaged to a portion of a vehicle, said assembly having bearings interposed between said mounting component and said spindle, said spindle having a central aperture having a threaded portion, wherein the improvement comprises:

an assembly maintenance tube within said central aperture of said spindle, said tube having a radially extending flange for contacting at least a portion of said bearings and a threaded portion threadedly engaged with said threaded portion of said central aperture in said spindle for enabling tightening said tube flange into engagement with said bearings for maintaining said mounting component, said bearings and said spindle as an assembly.

6. The invention as defined in claim 5 in which said assembly maintenance tube has a central aperture for receiving an axle.

7. The invention as defined in claim 5 together with locking means for preventing unintentional loosening of said tube with respect to said bearings.

8. The invention as defined in claim 7 in which said locking means is comprised of a second threaded portion on said tube adjacent an axially facing surface on said spindle and a nut on said second threaded portion is tightened against said shoulder to serve as a jam nut.

9. The invention as defined in claim 7 in which said locking means is comprised of a radially extending slot formed in said flange and a locking member forced into said slot frictionally engages at least a portion of said bearings.

10. The invention as defined in claim 9 in which said locking member is a roll pin.

11. A vehicle wheel assembly of the live spindle type, said assembly having an inboard axial side and an outboard axial side, said assembly comprising, in combination:

a mounting member having means for attaching said member to a vehicle, said mounting member having a bore;

a spindle mounted for rotation in said bore of said mounting member, said spindle having a central aperture having a threaded portion, said spindle further having a radially extending shoulder;

bearing means interposed between said bore and said spindle for facilitating rotation of said spindle with respect to said bore, said bearing means having an inboard and an outboard axial side and said shoulder on said spindle contacting at least a portion of said outboard side bearing means for limiting axial inboard movement of said spindle relative to said mounting member; and an assembly maintenance tube in said central aperture of said spindle, said tube having a central aperture for receiving a driveable axle, said tube further having a threaded portion threadedly engaged with said threaded portion of said central aperture of said spindle and a radially outwardly extending flange for contacting at least a portion of an axial inboard portion of said bearing means for limiting axial outboard movement of said spindle relative to said mounting member whereby said mounting member, said bearing means and said spindle are maintained as an assembled unit.

12. The invention as defined in claim 11 together with a driveable axle extending through said central aperture in said assembly maintenance tube, said axle being connected to said spindle whereby when one of said spindle and said axle is forced to rotate, said other of said spindle and said axle is forced to rotate.

13. The invention as defined in claim 12 in which said axle is axially moveable with respect to said spindle for relieving stress in a drive train connected to said axle.

14. The invention as defined in claim 13 in which a ring gear affixed to said spindle is engaged with a spline affixed to said axle for rendering said axle axially moveable with respect to said spindle.

* * * * *